United States Patent [19]
Thawley

[11] 3,811,477
[45] May 21, 1974

[54] BUOYANT LIQUID-CONVEYING HOSE
[75] Inventor: Clive S. Thawley, Colinton, Scotland
[73] Assignee: Uniroyal Limited, Newbridge, Midlothian, Scotland
[22] Filed: Dec. 13, 1972
[21] Appl. No.: 314,900

[30] Foreign Application Priority Data
Dec. 16, 1971 Great Britain.................... 58460/71

[52] U.S. Cl.............................. 138/103, 138/137
[51] Int. Cl............................................ F16l 11/12
[58] Field of Search........... 138/137, 149, 144, 153, 138/103, 119

[56] References Cited
UNITED STATES PATENTS
3,119,415  1/1964  Galloway et al................ 138/144 X
3,548,884  12/1970  Ambrose......................... 138/137 X Primary Examiner—Jerry W. Myracle
Attorney, Agent, or Firm—Charles A. Blank

[57] ABSTRACT

A buoyant liquid-conveying hose in which a hose body is surrounded by a first layer of buoyancy material with a second layer of different buoyancy material surrounding the first layer and a water-impermeable covering over the second layer. The compression modulus of the buoyancy material of the first layer is greater than that of the second layer.

6 Claims, 1 Drawing Figure

PATENTED MAY 21 1974          3,811,477
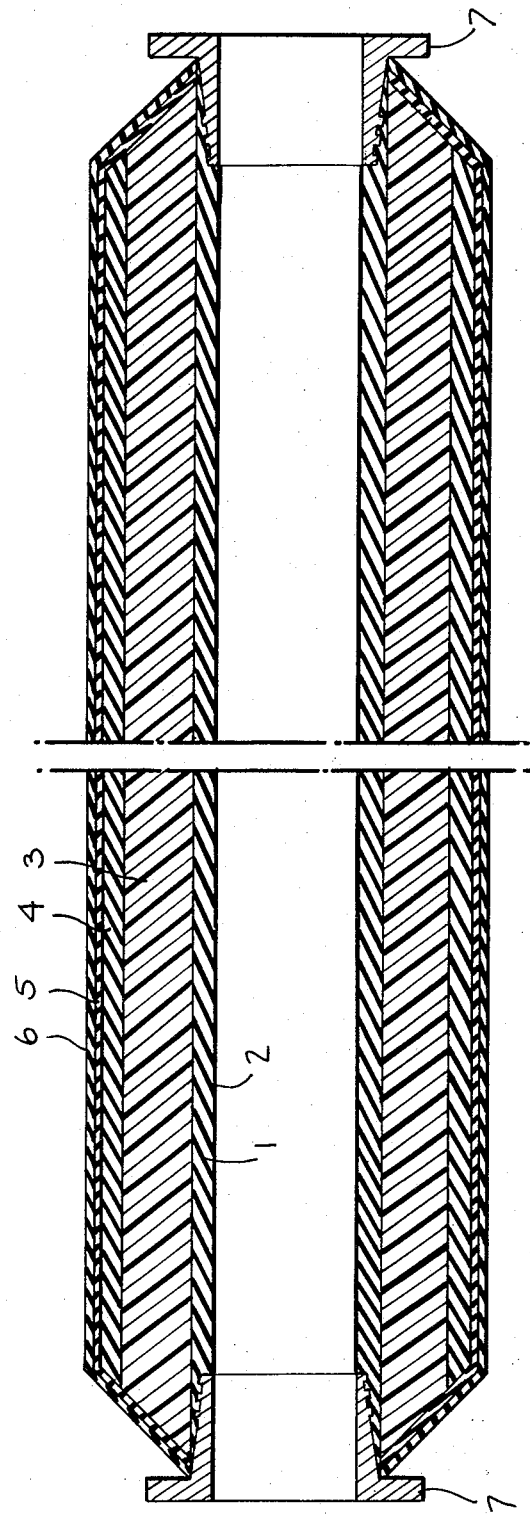

BUOYANT LIQUID-CONVEYING HOSE

This invention relates to hose and particularly to oil suction and discharge hose used in conveying oil across a body of water, for example, between a tanker and a shore installation.

It is well known that such hose is required to be buoyant when full of water, and there have in the past been various proposals for imparting the required buoyancy to the hose. Certain of these have involved providing buoyancy material as a continuous cover around previously vulcanized conventional hose, so that the hose and its buoyancy material form an integral structure. One of the difficulties of this technique, however, is that the ideal physical properties for the buoyancy material are incompatible. In particular the buoyancy material needs to have a high compression modulus in order that it may withstand compression due to hydrostatic pressure, and yet it needs to be flexible as the hose must be capable of flexing under the influence of water movement.

It is an object of the present invention, therefore, to provide a new and improved buoyant liquid-conveying hose which avoids one or more of the disadvantages of prior such hose.

It is another object of the invention to provide a new and improved buoyant liquid-conveying hose with sufficient resistance to hydrostatic pressure and with sufficient flexibility.

In accordance with the present invention, a hose which is buoyant when full of water comprises a hose body comprising elastomeric material, a first layer of buoyancy material surrounding said hose body, a second layer of different buoyancy material surrounding said first layer and a water-impermeable covering over said second layer, the compression modulus of the buoyancy material of the first layer being greater than that of the second layer.

A hose according to the invention thus has a composite buoyancy covering, with stiffer material capable of withstanding hydrostatic pressure placed closer to the neutral axis of the hose to reduce the resistance to flexure due to the presence of this material, and with less stiff buoyancy material thereover, allowing hose flexibility and making up the required total volume of buoyancy resultant If all the buoyancy material were of higher modulus material then flexibility of the hose would be reduced; if all were of the lower modulus material then the hose's resistance to hydrostatic pressure would be reduced.

Referring now more particularly to the drawing;

The FIGURE is a fragmentary view, in section, of a hose constructed in accordance with the invention.

For a better understanding of the present invention, together with other and further objects thereof, reference is made to the following description, taken in connection with the accompanying drawings, and its scope will be pointed out in the appended claims.

As shown in the drawing, the hose comprises a hose body 1 which may be of any conventional construction and will typically include an oil-resistant inner liner 2 covered by layers of elastomeric material in which may be incorporated one or more fabric breaker layers and one or more metallic reinforcing layers, such as layers of helically wound wire. The hose body is vulcanized before application of the buoyancy material and the details of its structure are not material to the present invention. Surrounding the hose body 1 is a first or inner layer 3 of buoyancy material, preferably comprising expanded plastic material, for example, cross-linked polyethylene, which has preferably been helically wound on to the hose body. Alternatively, the layer may, for example, be formed by a plurality of juxtaposed collars fitted over the hose body or by a jacket fitted over the hose body and secured along a line extending axially of the hose.

Surrounding the inner layer 3 is a second or outer layer 4 of different buoyancy material, preferably comprising closed-cell, expanded natural rubber, which has preferably been helically wound on to the second layer, but can also have been applied in other ways. The compression modulus of the buoyancy material of the first layer 3 is greater than that of the second layer 4.

Over the outer layer 4 is a water-impermeable cover comprising, for example, a first layer 5 of styrenebutadiene copolymer in which are embedded two plies of rubber-skim-coated tire cord laid at opposite bias angles, and a second layer 6 of a polyisoprene rubber, for example neoprene. After application of all layers to the hose body, curing of the material in layers 4, 5 and 6 may be effected in conventional manner. The hose has suitable metal couplings 7 at its ends.

Preferably the compression modulus of the inner buoyancy material 3 is such that the load needed for 50 percent compression is from 20 pounds per square inch to 50 pounds per square inch, and that of the outer buoyancy material 4 is such that the load needed for 50 percent compression is from 10 pounds per square inch to 30 pounds per square inch.

It is found that good results are obtained when the material of the inner layer 3 is an expanded plastic material and that of the outer layer 4 is a closed-cell expanded rubber. Particularly preferred plastic materials are expanded cross-linked polyethylene or expanded cross-linked ethylene-vinyl acetate, but other plastic materials can be used, other examples being expanded polyvinylchloride and polypropylene. The rubber used for the second layer may be natural rubber, a synthetic rubber or a blend of natural and synthetic rubbers. Particularly preferred are natural rubber, styrenebutadiene copolymer or blends of these two. Other synthetic rubbers that may be used are butyl or nitrile rubbers.

In this preferred plastic and rubber composite buoyancy layer, the rubber acts as a cushion between the outer cover of the hose and the plastics buoyancy layer and has the advantage of having better compression set resistance especially at higher temperatures. This facilitates storing the hoses in stacks where the ambient temperature is high. The rubber material also reduces the shear stress at the buoyancy material-cover interface during flexing below that which would be the case with an all plastic buoyancy layer. The expanded rubber, and often the outer cover will require curing, and it is found that the possibly deleterious effect of the curing heat on the plastic material is prevented or reduced by the heat insulating effect of the rubber layer.

In the preferred polyethylene-rubber composite buoyancy layer the polyethylene desirably has a density of from 1-½ lbs./cu.ft. to 10 lbs./cu. ft., and the rubber has a density of from 6 lbs./cu.ft. to 15 lbs./cu.ft.

Desirably, the ratio of the thicknesses of the inner to the outer layer of buoyancy material is about 3:1, but this may vary. The material of the covering layer may be any one or more of a number of water-impermeable polymers.

In a specific example of a 20 inch bore hose constructed in this manner the respective thicknesses and densities of the various layers were as follows:

|  | Thickness | Average Density |
|---|---|---|
| Inner buoyancy layer 3 | 3.0" | 5½ lbs./cu.ft. |
| Outer buoyancy layer 4 | 1.0" | |
| First cover layer 5 | 0.25" | |
| Second cover layer 6 | 0.125" | |

The compression deflection characteristics of the inner layer 3 were:

|  | Load (lbs./sq.in.) |
|---|---|
| 10% compression | 12.5 |
| 20% compression | 16.0 |
| 30% compression | 17.5 |
| 50% compression | 25.0 |

The compression deflection characteristics of the outer layer 4 were:

|  | Load lbs./sq.in. |
|---|---|
| 10% compression | 5.0 |
| 20% compression | 9.0 |
| 30% compression | 12.5 |
| 50% compression | 20.0 |

Overall, the hose when filled with water had a density of 50 lbs./cu.ft. and was thus buoyant.

This composite construction is of lower density than a hose having its buoyancy provided solely by expanded rubber, and has greater resistance to hydrostatic compression. It also has greater flexibility than a hose having its buoyancy material constituted wholly by polyethylene.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

I claim:

1. A hose which is buoyant when full of water comprising a hose body comprising elastomeric material, a first layer of expanded buoyancy material surrounding said hose body, a second layer of different buoyancy material surrounding said first layer and a water-impermeable covering over said second layer, the compression modulus of said buoyancy material of said first layer being greater than that of said second layer.

2. A hose in accordance with claim 1 in which said first layer of buoyancy material is an expanded plastic material.

3. A hose in accordance with claim 1 in which said first layer of buoyancy material is expanded crosslinked polyethylene.

4. A hose in accordance with claim 3 in which said polyethylene layer has a density in the range from 1.5 pounds per cubic foot to 10 pounds per cubic foot.

5. A hose in accordance with claim 1 in which said second layer of buoyancy material is a closed-cell expanded rubber.

6. A hose in accordance with claim 5 in which said rubber layer has a density in the range from 6 pounds per cubic foot to 15 pounds per cubic foot.

* * * * *